No. 800,697. PATENTED OCT. 3, 1905.
E. E. WARD.
DOUGH MIXING MACHINE.
APPLICATION FILED DEC. 13, 1904.
3 SHEETS—SHEET 1.
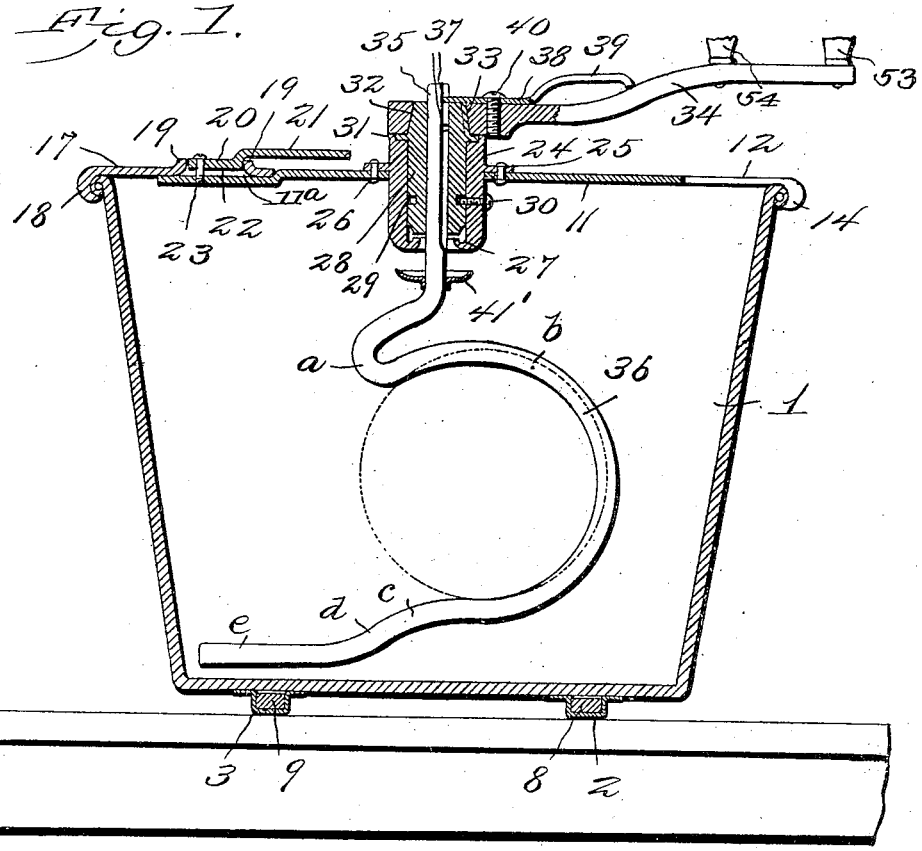
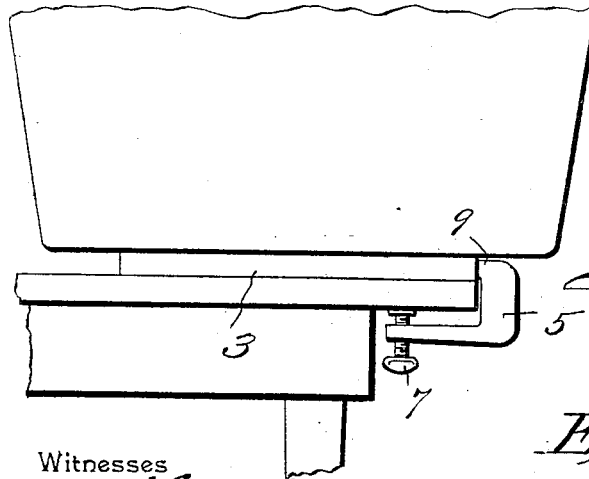
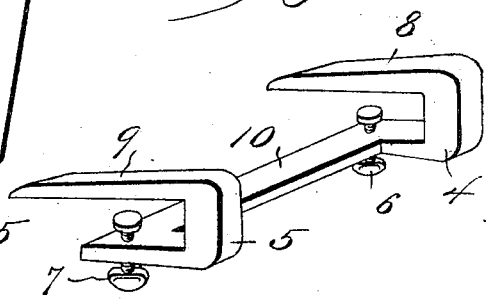
Witnesses
Elmer E. Ward,
Inventor.
by C. A. Snow & Co
Attorneys No. 800,697. PATENTED OCT. 3, 1905.
E. E. WARD.
DOUGH MIXING MACHINE.
APPLICATION FILED DEC. 13, 1904.

3 SHEETS—SHEET 2.

Witnesses
E. F. Stewart
W. H. Clarke.

Elmer E. Ward,
Inventor.
by C. A. Snow & Co
Attorneys

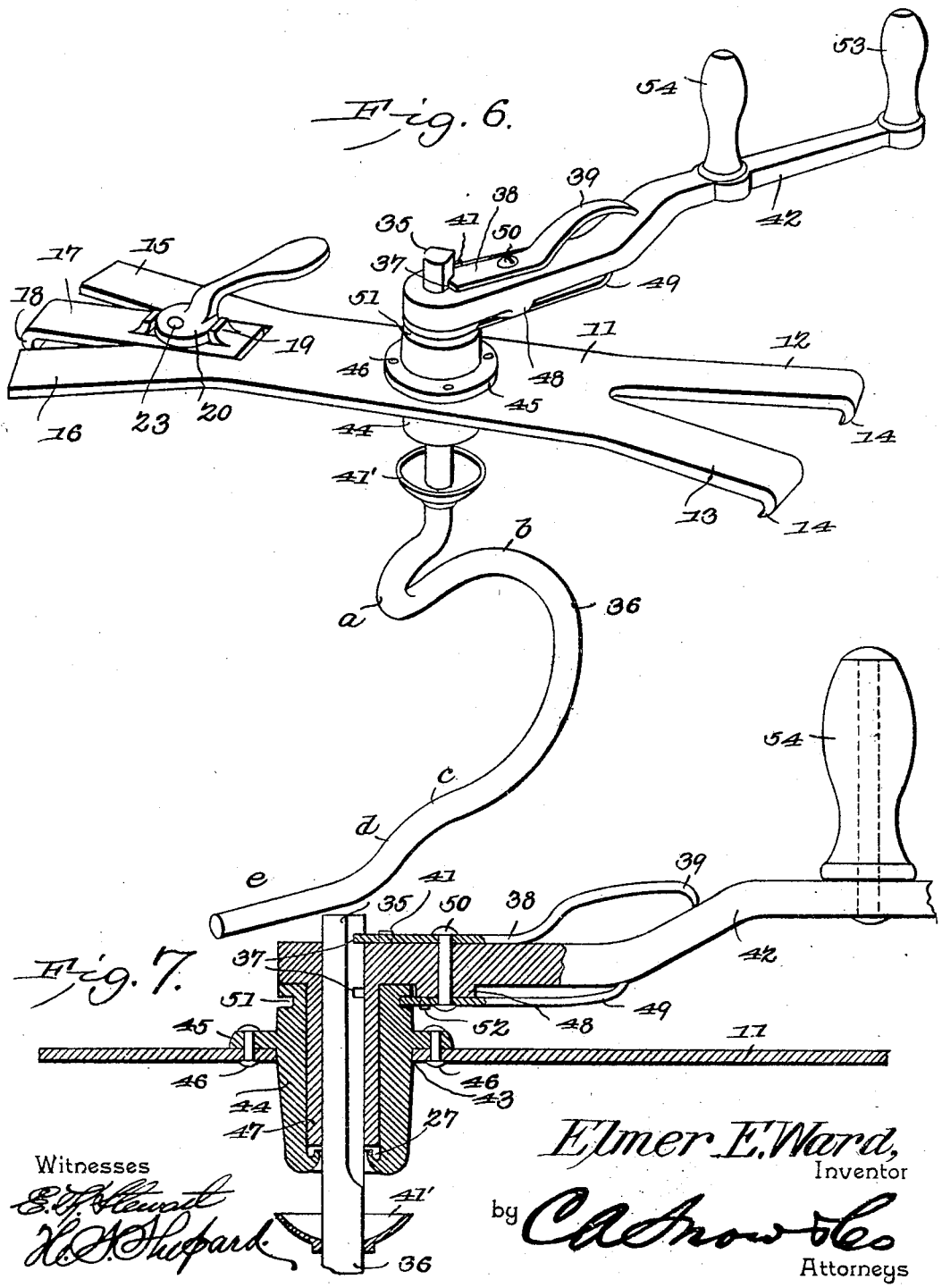

UNITED STATES PATENT OFFICE.

ELMER E. WARD, OF SALT LAKE CITY, UTAH.

DOUGH-MIXING MACHINE.

No. 800,697.   Specification of Letters Patent.   Patented Oct. 3, 1905.

Application filed December 13, 1904. Serial No. 236,703.

*To all whom it may concern:*

Be it known that I, ELMER E. WARD, a citizen of the United States, residing at Salt Lake City, in the county of Salt Lake and State of Utah, have invented a new and useful Dough-Mixing Machine, of which the following is a specification.

This invention relates to dough mixing and kneading machines; and in general its object is to improve and simplify the construction and increase the efficiency of operation of such devices.

It is furthermore designed to embody the invention in the nature of a complete attachment capable of being fitted to any ordinary receptacle without alteration or change therein and to clamp the device firmly upon the receptacle, so as to prevent it from working loose thereon.

In dough stirring and kneading devices it is a common experience to have the dough rise around the stirrer at the center of the batch of dough, which interferes with the convenient manipulation of the stirrer and also impairs the mixing or kneading of the dough, and in view of this difficulty it is proposed to arrange the stirrer so as to prevent such a rising of the dough at the center of the batch.

In addition to the tendency to rise at the center of the batch there is a stage in the mixing or kneading of the dough when it becomes tough and materially interferes with the operation of the stirrer, and in view of this difficulty it is designed to provide for adjustably elevating the stirrer, so as to work through the upper portion only of the batch of dough until the tough stage has passed, when the stirrer may be lowered to its original position for finishing the stirring and kneading operation.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 2:
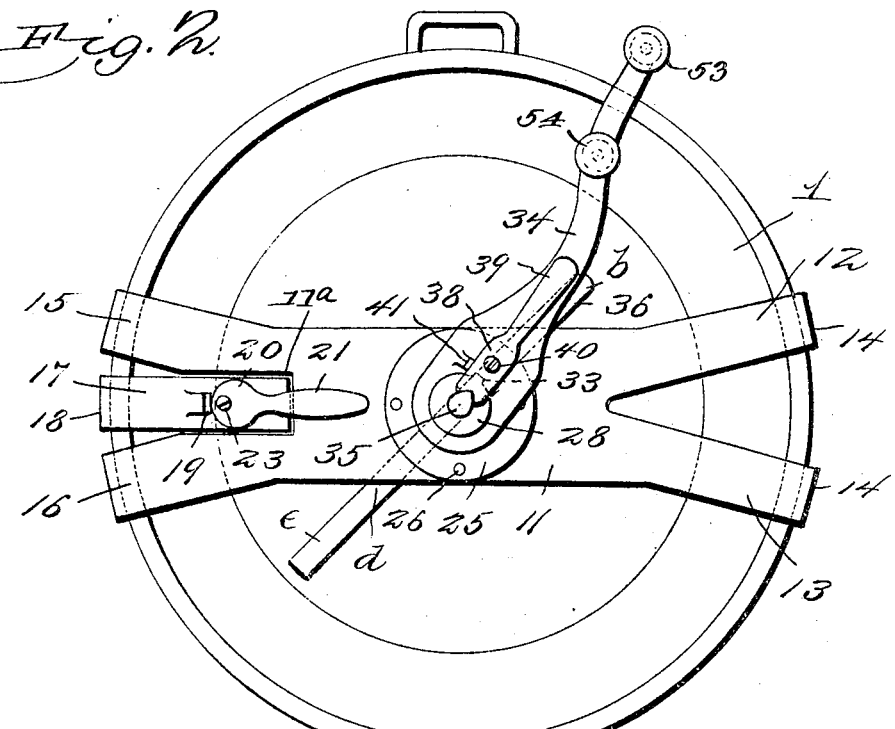
Figure 3:
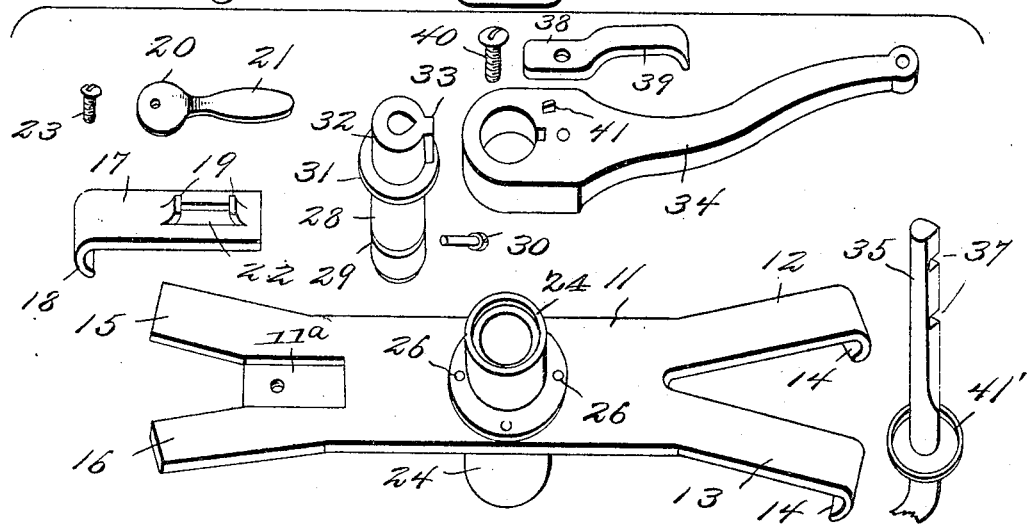

In the accompanying drawings, Figure 1 is a vertical central sectional view of one embodiment of the present invention mounted upon a receptacle. Fig. 2 is a plan view thereof. Fig. 3 is a view in perspective of the supporting-bar or cross-head and the several parts which are supported thereon in separated relation. Fig. 4 is a fragmentary elevation of the receptacle for the support of the present apparatus at right angles to Fig. 1, showing the manner of clamping the receptacle upon the table or other support. Fig. 5 is a detail perspective view of the clamping means. Fig. 6 is a detail perspective view of the preferred embodiment of the kneading or stirring apparatus. Fig. 7 is an enlarged detail sectional view showing the mounting of the stirrer member and the operating crank-handle upon the supporting cross-head of the apparatus.

Like characters of reference designate corresponding parts in each and every figure of the drawings.

The pail or receptacle 1 of the improved dough mixing and kneading machine may be of any suitable form and construction. Attached to its bottom are two elongated socket-pieces or tubes 2 and 3, which preferably are square or rectangular in cross-section. The socket-pieces 2 and 3 are parallel with each other and are open at each end. They are located adjacent to the periphery of the pail-bottom on opposite sides thereof, so as to be nearer the edge of the pail than the center thereof. Clamps 4 and 5, having set-screws 6 and 7 and formed with shank portions 8 and 9, shaped to fit the socket-pieces 2 and 3, are provided for attaching the pail 1 securely to a table or other support. The clamps 4 and 5 are connected by or formed integrally upon the opposite ends of a bar 10.

By disposing the socket-pieces 2 and 3 in parallel relation with each other and separating them to such a degree that they are nearer the edge of the pail than the center thereof they act not only as ribs to strengthen and brace the bottom of the receptacle, but also as projections or legs to support and balance the device. Furthermore, by separating them to the extent indicated the clamps 4 and 5 are enabled more easily to maintain the receptacle rigid upon the table or other support, and it is unnecessary to tighten the clamps as much as would be necessary if the socket-pieces were disposed close to each other or only one socket-piece were employed. For this reason scratching or bruising of the table by excessive tightening of the clamps is avoided.

Arranged across the upper end of the pail or receptacle 1 is a bar 11. At one end the bar 11 is formed with two diverging arms 12 and 13, the ends of which are bent to form hooks 14, adapted to engage the rim of the pail 1. At the opposite end the bar 11 is formed with two flat diverging arms 15 and 16, which rest upon the rim of the receptacle, but are not provided with hooks. Adjacent to the arms 15 and 16 the bar 11 has a preferably rectangular groove or depression 11ª, in which is seated a sliding plate 17, formed at its outer end, which is located between the arms 15 and 16, with a hook 18 adapted to engage the rim of the receptacle opposite the hooks 14. It will be observed that the groove or depression in which it is mounted causes the sliding hook-plate 17 to lie in the same horizontal plane with the flat arms 15 and 16 of bar 11. Formed upon the sliding plate 17 are two upwardly-extending lugs 19 19, between which is disposed the disk-shaped end 20 of a lever 21. The lugs 19 19 are formed at opposite ends of a longitudinal slot 22 in the sliding plate 17. Extending through the disk 20, slot 22, and bar 11 is a fulcrum-pin 23, which is set rigidly into the bar 11. It will be observed that the pin 23 is located eccentrically with respect to the disk 20, whereby upon moving the lever 21 one way or the other the sliding plate 17 is caused to move longitudinally upon the bar 11 to throw its hooked end 18 into or out of engagement with the rim of the receptacle 1.

The central portion of the bar 11 is perforated to receive a hub 24, which is provided with an annular flange 25, that rests upon the upper surface of the bar 11 and is attached thereto by means of rivets 26. At its lower end the hub 24 is curled inward and upward to form an annular trough 27, adapted to prevent grease, oil, or dirt from dropping into the receptacle below. Seated in the hub 24 is a revolving journal 28, which is formed near its lower end with an annular groove 29, into which projects the end of an adjusting-screw 30, extending through the hub 24. By retracting the screw 30 the journal 28 may be removed from the hub 24 for cleaning or lubricating purposes. Near its upper end the journal 28 is provided with an annular flange 31, which fits into the internally-rabbeted upper end of the hub 24. Above the flange 31 the upper end of the journal 28 is tapered, as shown at 32, and is formed with a vertical rib or spline 33. The crank-handle 34 is formed with a tapered bore to receive the tapered upper end 32 of the journal 28 and with a vertical groove to receive the rib 33, whereby when the crank is revolved its rotation is transmitted to the hub 28.

Extending vertically through an irregular or non-circular bore in the journal 28 is the irregular upper end 35 of a stirrer 36. The stirrer 36 is formed with an upper end irregular or non-circular in cross-section and fitting an irregular bore in order that it may be caused to revolve with the journal 28. Formed in the non-circular upper end of the stirrer 36 is a plurality of notches 37. A lever 38, having a downwardly-bent rear end 39, is pivotally mounted upon the crank by means of a rivet or bolt 40. A lug or projection 41 is provided on the crank 34 to limit the movement in one direction of the lever 38. The short end of the lever 38 is adapted to engage one of the notches 37 in the end 35 of the stirrer 36 and is rigidly held in such engagement by the end 39 binding on the crank at that point. By means of the lever 38 and notches 37 the stirrer 36 may be adjusted vertically in its journal 28 to dispose its lower end close to or away from the bottom of the receptacle or may be removed entirely from the journal 28.

Upon the upper end 35 of the stirrer 36, below the hub 24 and journal 28, is mounted a cup or dished disk 41′, adapted, in conjunction with the annular trough 27 at the lower end of the hub 24, to insure that no oil, grease, or dirt will drop into the receptacle.

The stirrer 36, which preferably is made of rod metal, is formed below the dished disk 41′ with a downwardly-extending loop $a$, one end of which is bent into an approximately circular portion $b$. It will be observed from the true circle indicated in dotted lines that the portion $b$ is not quite circular in form. At its lower end the stirrer extends off at a tangent to the approximately circular portion, as shown at $c$. It then takes a downward incline, as shown at $d$, and terminates close to the periphery and bottom of the receptacle in a horizontal portion $e$.

Experience and practice have demonstrated that the form of stirrer described produces excellent results and kneads the dough with expedition. It will be observed that the approximately circular portion $b$ of the stirrer lies off to one side of a line drawn centrally through the receptacle and that the lower end $e$ of the stirrer is disposed at the opposite side of the receptacle. For this reason the end $e$ kneads the lower portion of the dough and the portion $b$ kneads the middle or upper portion thereof. In practice it has been found that the dough in old forms of mixers tends to excessively rise at the center around the stirrer. This excessive tendency is effectually combated in the present device by the downwardly-extending loop $a$ of the stirrer. It also has been found laborious in practice to mix the dough at a certain stage in the operation of the device, due to the fact that the dough gradually becomes tough during the kneading operation. This difficulty has been cured in the present device by providing a vertically or longitudinally adjustable stirrer, which can be kept near the bottom of the receptacle at first and raised therefrom as the dough arrives at the half-mixed and tough stage.

It will be observed that the bar 11, with its rigid diverging legs, provides a strong integral support for the stirrer and that the sliding hook-plate 17 serves only to hold the bar in position. Heretofore in a dough-mixer a sliding plate has been used; but, in addition to acting as a hook, it has been made to support one end of the bar with its stirrer and bearings, no diverging legs being provided on the sides of the plate for this purpose. Such prior construction lacking such rigidity, the present device is designed as an improvement thereupon. As before remarked, it will be observed that the depression in which the sliding plate 17 is mounted causes said plate to lie in the same horizontal plane with the diverging arms 15 and 16, whereby it securely grips the rim of the receptacle.

In the embodiment of the invention shown in Figs. 6 and 7 the main features of the device—such as the stirrer 36, the supporting frame or cross-head 11, with its hooked branches 12 and 13, the other branches 15 and 16, and the clamping member 17, with its adjusting clamp 20—are precisely the same as hereinbefore described, the only difference residing in the manner of mounting the crank-handle 42. In this form of the device the cross-head 11 is provided with a central opening 43, through which projects a tubular open-ended hub 44, extending at the top and bottom of the cross bar or frame and having an external annular flange 45 fitted to the top of the cross-bar and rigidly connected thereto by means of rivets 46 or other suitable fastenings. The crank 42 is provided at its inner end with an integral tubular open-ended journal 47, rotatably fitted within the hub and designed to receive the non-circular shank portion of the stirrer 36. Upon the top of the crank-handle is an intermediately-pivoted latch or lever 38, designed for alternate engagement with the respective notches 37 of the upper non-circular end of the stirrer, as and for the purpose hereinbefore described. The rear end portion of this latch or lever is bent down, as at 39, and has sufficient elasticity to frictionally bear upon the crank-handle 42, so as to prevent accidental movement of the latch. The crank-handle 42 is provided upon its top with an upstanding stop 41, as in Fig. 2, to limit the movement of the latch-lever 38 and insure the proper engagement of the latter with the notched portion of the stirrer. Upon the under side of the crank-handle 42 is a boss 48, upon which an intermediately-fulcrumed latch-lever 49 is mounted, the single fastening 50 serving as the fulcrums for the two latch-levers. The rear end of the lever 49 is bent to frictionally engage the under side of the crank-handle 42, while its forward end is designed to take into an annular groove or channel 51, formed externally in the hub 44, whereby the journal 47 is held against endwise movement in the hub and the crank-handle is held in place. A suitable stop projection 52 depends from the boss 48 in the path of the latch-lever 49, so as to stop the latter when registered with the groove 51. As in the first-described form of the device, the shank portion of the stirrer is provided with a drip-cup 41' to catch such lubricant as may drip from the bearing. The advantage of the preferred form of bearing resides in its simplicity and ease of assemblage and disconnection, as there are practically but two members—the hub 44 and the journal 47—whereas in the form shown in Figs. 1 to 3, inclusive, the journal 28 is separate from the crank-handle 34, and therefore it is necessary to employ a number of other parts to effect the connection of the journal with the crank and to prevent endwise play of the journal within the hub.

In each form of the apparatus the operating crank-handle is provided with an outer upstanding hand-grasp 53 and a similar hand-grasp 54, located inwardly from the outer hand-grasp. The inner hand-grasp 54 is employed for rotating the crank in the initial stage of the kneading or stirring operation, as a great many rotations of the stirrer are desired; but when the dough becomes tough the operator takes hold of the outer hand-grasp 53, so as to obtain a greater leverage upon the crank-handle. From this explanation it will be understood that the provision of the inner and outer hand-grasps has a very important advantage, as the stirrer can be initially more quickly and more advantageously operated, for the path of movement of the operator's hand is comparatively short, and when greater leverage is necessary to overcome the increased resistance of the dough in its tough stage the operator may shift his hand to the outermost hand-grasp, and thereby obtain the desired increase of leverage with a greater path of movement of the hand and a slower movement.

Having thus described the invention, what is claimed is—

1. A dough-mixer having a receptacle, a bar provided at each end with diverging arms, one set only of the arms terminating in downturned hooks, the terminals of the other set of arms being flat to rest on the rim of the receptacle, and a slidably-adjustable plate working between the said other arms and terminating in a hook to embrace the edge of the receptacle.

2. A dough-mixer having a receptacle, a bar thereacross provided with hook portions at one end and a depression at the other, a sliding plate in the depression having a slot formed with a lug at each end, a lever having a disk-shaped end located between the lugs, and a pin passing eccentrically through the disk-shaped end of the lever, the slot in the sliding plate and the bar.

3. A dough-mixer having an endwise-adjustable stirrer formed with a plurality of notches, a crank to rotate the stirrer, a lever on the crank to engage the notches and adjustably supporting the stirrer.

4. A dough-mixer comprising a supporting-frame having diverged arms at opposite ends, one set only of the arms being hooked to engage the top of a receptacle, a slidable hooked clamping member working between the other set of diverged arms to grip the upper edge of a receptacle, a stirrer carried by the frame, and means mounted upon the frame for operating the stirrer.

5. A dough-mixer comprising a supporting-frame which is provided at one end with a terminal hook for engagement with the rim of a receptacle, the opposite end of the frame being provided with spaced arms to rest upon the opposite portion of the rim of the receptacle, a hooked slidable clamping member carried by the frame between the arms with its hook arranged to engage the rim of the receptacle, a stirrer carried by the frame, and means carried by the frame to rotate the stirrer.

6. A dough-mixer comprising a supporting-frame provided at one end with a hook to engage the rim of a receptacle, the opposite end of the frame being provided with spaced arms to rest upon the opposite portion of the rim of the receptacle, a slidable clamping member working between the arms and provided at its outer end with a hook to engage the rim of the receptacle, said clamping member being provided with a longitudinal slot having upstanding shoulders at opposite ends, a fastening rising from the frame through the slot of the clamping member, and an eccentric mounted to rotate upon the fastening between and in coöperative relation with the shoulders, a stirrer carried by the frame, and means mounted upon the frame for rotating the stirrer.

7. A dough-mixer comprising a supporting-frame, a tubular hub carried by and piercing the frame, a stirrer member having a shank portion rotatable in the hub and provided with a series of seats, a crank-handle connected to the shank of the stirrer for simultaneous rotation therewith, and a latch carried by the crank-handle for individual engagement with the seats of the stirrer, the stirrer being vertically adjustable through the crank to permit engagement of the latch with the individual seats.

8. A dough-mixer comprising a support having a tubular hub piercing the same, a stirrer having a shank rotatable within the hub and adjustable endwise therethrough, said shank being provided with a series of seats, an operating-crank connected for simultaneous rotation with the shank and the latter capable of endwise adjustment therethrough, and a latch-lever mounted upon the crank for engagement with the individual seats of the stirrer-shank to support the stirrer at different elevations.

9. A dough-mixer comprising a frame having a tubular hub piercing the same and provided with an external annular channel, a stirrer having a shank portion rotatable within the hub, a crank-handle rotatable upon the hub and connected to the shank of the stirrer, and means carried by the crank-handle for engagement with the annular channel to prevent displacement of the handle.

10. A dough-mixer comprising a frame having a tubular hub piercing the same and provided with an external annular channel, a stirrer having a shank portion rotatable within the hub, a crank-handle rotatable upon the hub and connected to the shank, and a latch-lever carried by the crank-handle and engaging the channel to prevent displacement of the handle.

11. A dough-mixer comprising a frame having a tubular hub piercing the same and provided with an external annular channel, a stirrer having a shank rotatable within the hub and provided with a series of seats, a crank-handle rotatable upon the hub and connected to the shank, a latch-lever fulcrumed upon the top of the crank for individual engagement with the seats of the shank, and another latch-lever fulcrumed upon the under side of the crank for engagement with the annular channel of the hub to prevent displacement of the handle.

12. A dough-mixer comprising a frame having a tubular hub piercing the same, a stirrer having a non-circular shank portion rotatable within the hub and provided with a series of seats, a crank-handle having a tubular journal mounted to rotate in the hub with its bore non-circular for the reception of the non-circular portion of the shank of the stirrer, and a latch-lever mounted upon the crank-handle for engagement with the individual seats of the stirrer-shank.

13. A dough-mixer comprising a frame having a tubular hub piercing the same and provided with an external annular channel, a crank-handle having a tubular journal rotatable within the hub and provided with a non-circular bore, a stirrer having a non-circular shank portion received within the journal and adjustable endwise therein and also provided with a series of seats, a latch-lever fulcrumed upon the crank-handle for engagement with the individual seats of the stirrer-shank, and another latch-lever fulcrumed upon the crank-handle for engagement with the annular groove of the hub.

In testimony that I claim the foregoing as my own I have hereto affixed my signature in the presence of two witnesses.

ELMER E. WARD.

Witnesses:
N. V. BATES,
JOHN H. PHELAN.